United States Patent
Bourcier et al.

(10) Patent No.: US 8,460,532 B2
(45) Date of Patent: *Jun. 11, 2013

(54) DEIONIZATION AND DESALINATION USING ELECTROSTATIC ION PUMPING

(75) Inventors: William L. Bourcier, Livermore, CA (US); Roger D. Aines, Livermore, CA (US); Jeffery J. Haslam, Livermore, CA (US); Charlene M. Schaldach, Pleasanton, CA (US); Kevin C. O'Brien, San Ramon, CA (US); Edward Cussler, Edina, MN (US)

(73) Assignees: Lawrence Livermore National Security, LLC, Livermore, CA (US); Regents of the University of Minnesota, Minneapolis, MN (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/159,862

(22) Filed: Jun. 14, 2011

(65) Prior Publication Data

US 2011/0253538 A1 Oct. 20, 2011

Related U.S. Application Data

(62) Division of application No. 11/655,423, filed on Jan. 19, 2007, now Pat. No. 7,981,268.

(60) Provisional application No. 60/761,484, filed on Jan. 23, 2006.

(51) Int. Cl.
*B03C 5/02* (2006.01)

(52) U.S. Cl.
USPC ........... 204/663; 204/554; 204/666; 204/672; 204/674

(58) Field of Classification Search
USPC ................. 204/450, 553, 554, 600, 648, 660, 204/663, 665, 666, 672
See application file for complete search history.

(56) References Cited

U.S. PATENT DOCUMENTS

| | | | |
|---|---|---|---|
| 3,893,898 A | 7/1975 | Candor | |
| 4,057,482 A | 11/1977 | Candor | |
| 4,948,514 A | 8/1990 | MacGregor et al. | |
| 5,858,199 A | 1/1999 | Hanak | |
| 6,017,433 A * | 1/2000 | Mani | 204/524 |
| 6,277,265 B1 | 8/2001 | Hanak | |
| 7,828,883 B2 * | 11/2010 | Aines et al. | 204/554 |
| 2004/0007452 A1 | 1/2004 | Warren | |

FOREIGN PATENT DOCUMENTS

WO  WO 2004/037421 A  5/2004

* cited by examiner

*Primary Examiner* — Keith Hendricks
*Assistant Examiner* — Steven A. Friday
(74) *Attorney, Agent, or Firm* — Eddie E. Scott

(57) ABSTRACT

The present invention provides a new method and apparatus/system for purifying ionic solutions, such as, for example, desalinating water, using engineered charged surfaces to sorb ions from such solutions. Surface charge is applied externally, and is synchronized with oscillatory fluid movements between substantially parallel charged plates. Ions are held in place during fluid movement in one direction (because they are held in the electrical double layer), and released for transport during fluid movement in the opposite direction by removing the applied electric field. In this way the ions, such as salt, are "ratcheted" across the charged surface from the feed side to the concentrate side. The process itself is very simple and involves only pumps, charged surfaces, and manifolds for fluid collection.

11 Claims, 4 Drawing Sheets

DEIONIZATION AND DESALINATION USING ELECTROSTATIC ION PUMPING

CROSS-REFERENCE TO RELATED APPLICATIONS

This application is a Divisional of application Ser. No. 11/655,423 filed Jan. 19, 2007, entitled "Deionization and Desalination using Electrostatic Ion Pumping". This application claims the benefit of U.S. Provisional Patent Application No. 60/761,484, filed Jan. 23, 2006, and titled "Desalination Using Electrostatic Ion Pumping", which are incorporated herein by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND OF THE INVENTION

1. Field of the Invention

The present invention relates to a separation method and apparatus/system for removing ions, contaminants and impurities from fluids such as water and other aqueous process streams, and more particularly, the present invention relates to a separation method and apparatus/system for desalinating water that uses engineered charged surfaces to sorb ions from salt solutions.

2. Description of Related Art

Conventionally, the separation of ions and impurities from electrolytes has been achieved using a variety of processes including: ion exchange, reverse osmosis, electro dialysis, electrodeposition, and filtering. In conventional reverse osmosis systems, for example, water is forced through a membrane, which acts as a filter for separating the ions and impurities from water. Reverse osmosis systems require significant energy to move the water through the membrane. The flux of water through the membrane results in a considerable pressure drop across the membrane. This pressure drop is responsible for most of the energy consumption by the process. The membrane also degrades with time, requiring the system to be shut down for costly and troublesome maintenance.

Other methods have been proposed and address the problems associated with conventional separation processes. However, these proposed methods have not been completely satisfactory and have not met with universal commercial success or complete acceptance. One such proposed ion separation method is a process for desalting water based on periodic sorption and desorption of ions on the extensive surface of porous carbon electrodes.

Other exemplary processes which further illustrate the problems associated with ion exchange include residential water softening and the treatment of boiler water for nuclear and fossil-fueled power plants. Such water softeners result in a relatively highly concentrated solution of sodium chloride in the drinking water produced by the system. Therefore, additional desalination devices, such as reverse osmosis filters are needed to remove the excess sodium chloride introduced during regeneration.

Based on still unsolved problems associated with conventional systems and because of a growing global shortage, there is still a significant and growing need for a new method and apparatus/system that lower all costs associated with water treatment, especially desalination. Energy use is of great importance because the cost of energy is approximately half the total cost of desalination of seawater using reverse osmosis, currently the most energy efficient sea water desalination technology.

Accordingly, a need exists for new desalination methods and apparatus that are more robust, that can lower capital and operating costs, that are more immune from scaling and fouling, and that are easier to clean than existing technologies while being continuous in operation, operator friendly, amenable to remote operation, and modular in design. The present invention is directed to such a need.

SUMMARY OF THE INVENTION

The present invention is directed to a deionization ion pumping process that includes a feed fluid through a first channel; directing a fluid concentrate through a second channel; oscillating a fluid flow therethrough a plurality of flow channels so as to fluidly communicate the first channel with the second channel; applying a synchronized periodic electric field about each of the plurality of flow channels in conjunction with the oscillating fluid flow to enable a directed movement of predetermined ions from the first channel to the second channel; and harvesting a desired processed feed fluid from the first channel and a desired processed concentrate fluid from the second channel.

Another aspect of the present invention is directed to a desalination apparatus that includes a feed flow channel; a concentrate flow channel; a plurality of flow channels configured to fluidly communicate an oscillating flow between the feed and the concentrate flow channels; and one or more pairs of conductive plates adapted about the plurality of flow channels, wherein an applied synchronized periodic electric field to the one or more pairs of conductive plates in conjunction with the oscillating flow facilitates a directed movement of predetermined ions therethrough the predetermined flow channels from the feed flow channel to the concentrate flow channel.

A final aspect of the present invention is directed to a capacitive deionization pumping system that includes: a feed flow channel; a concentrate flow channel; a plurality of flow channels configured to fluidly communicate an oscillating flow between the feed flow channels and the concentrate flow channels; and one or more pairs of conductive plates adapted about the plurality of flow channels, an electrical circuit electrically coupled to the one or more pairs of conductive plates; a fluid circuit fluidly coupled to the feed flow channel and the concentrate fluid channel so as to produce the oscillating flow; and a computer configured to control the electrical circuit and the fluid circuit so as to apply a periodic electric field to the one or more pairs of conductive plates in synchronization with the produced oscillating flow to facilitate a directed movement of predetermined ions therethrough the predetermined flow channels from the feed flow channel to the concentrate flow channel.

Accordingly, the present apparatus/system and method provides a desired technology for the deionization of fluids, but more specifically provides a desired technology for the desalination of all types of brackish, sea water, and brines. Such apparatus/systems and methods disclosed herein increase the amount of water available for use by tapping into the essentially infinite available brackish water supply that exists in the subsurface and it makes it cheaper to desalt and use sea water as needed. Applications include, but are not limited to, use as a brine concentrator for brine minimization, salt resource extraction, zero liquid discharge (ZLD), treatment of problematic waste streams, and/or resource recycling in industrial applications.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 3b shows the movement of cations and anions with the e-field on.

DETAILED DESCRIPTION OF THE INVENTION

Figure 1:
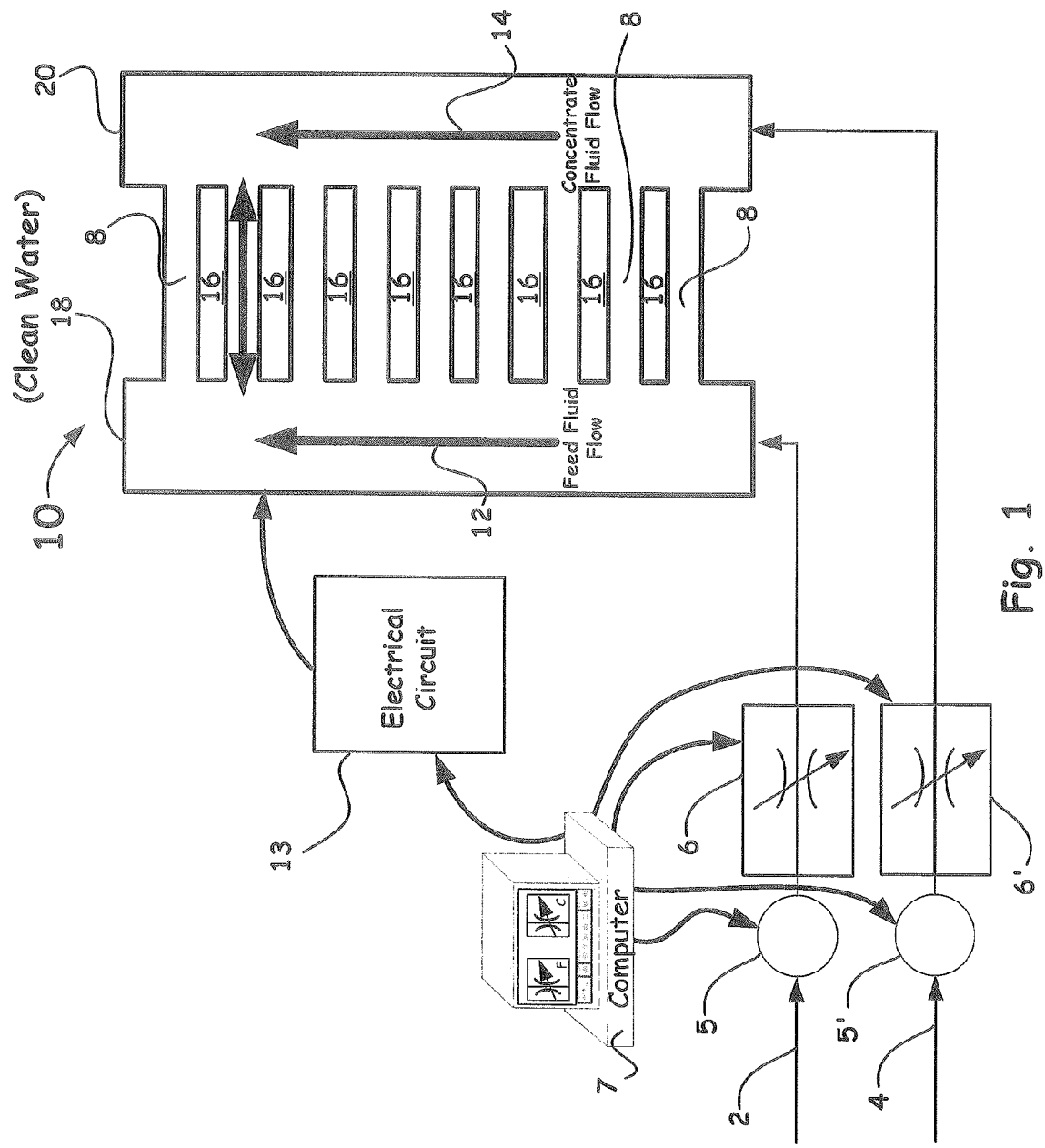
FIG. 1 is a general illustration of an ion pump apparatus of the present invention.

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

Moreover, in the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

Finally, various terms used herein are described to facilitate an understanding of the invention. It is understood that a corresponding description of these various terms applies to corresponding linguistic or grammatical variations or forms of these various terms. It will also be understood that the invention is not limited to the terminology used herein, or the descriptions thereof, for the description of particular embodiments. Merely by way of example, the invention is not limited to merely removing salt ions as discussed herein.

General Description

The present invention provides for a method and system (e.g., a desalination system and method) that utilizes synchronized externally applied electrostatic fields in conjunction with an oscillating fluid flow to immobilize and separate ions from fluids. While salt ion removal from water is a preferred embodiment, it is to be understood that other ions can also be beneficially removed from fluids, as disclosed herein by the apparatus/systems and methods of the present invention. The ion pump separates any non-ionic liquid, from ionic impurities contained within that liquid. The present invention may therefore be used to purify either the liquid, as in the case of water, or the salts. One outlet stream has liquid reduced in salt content, and the other side it is increased and this side is useful if the valuable product is the salt, and not the fluid. In addition, many drugs are inherently ionic chemicals that can be separated by the methods disclosed herein from a liquid in which they have been created. As another beneficial embodiment, the methods and apparatus/system can be configured to separate valuable minerals, such as, but not limited to lithium.

Because the ions have to traverse a long pathway, the various ions can also be separated to a certain extent as in electrophoresis, so the method may be useful in separating one ion from another. In this case the exact makeup of the plate surfaces may be adapted to encourage such a separation process by holding one ion longer than another. In such an arrangement, the present invention can be used to separate proteins, sugars, and/or amino acids.

Some other fluids that might be purified besides water include, but are not limited to, alcohols, petroleum, benzene, molten plastics (the process can inherently handle melted materials because it is not sensitive to temperature), butter, fats, and oils; milk, blood serum, molten glass, or semiconductor materials like silicon and gallium where trace impurities have to be removed at a very high level.

Such other ions capable of being removed by the present invention include: Non oxidizable organic and inorganic anions (e.g., Inorganic anions such as, but not limited to: $OH^-$, $Cl^-$, $F^-$, $NO_3^-$, $SO_4^{2-}$, $HCO_3^-$, $CO_3^{2-}$, $H_2PO_4^-$, $HPO_4^{2-}$, and $PO_4^{3-}$, etc.); Non reducible cations (e.g., $Li^+$, $Na^+$, $K^+$, $Cs^+$, $Mg^{++}$, $Ca^{++}$, etc.); Reducible cations, (e.g., $Cu^{++}$, $Fe^{++}$, $Pb^{++}$, $Zn^{++}$, $Cd^{++}$, etc.) and Colloidal particles such as bacteria, viruses, oxide particles, dirt, dust, etc.

In particular, such example ions as discussed above, but more often, salt (e.g., $Na^+$ and $Cl^-$) ions are held in place during fluid movement in one direction, and released for transport during fluid movement in the opposite direction. The targeted ions (e.g., salt) are "ratcheted" across the charged surface from the feed side to the concentrate side. The present invention is not limited by high salinities and does not need to overcome osmotic pressure and so can be used for concentrated brines more saline than sea water. It does not involve high pressure and the need for expensive pressure vessels for containment. In this regard, the present invention can be utilized as a brine concentrator for brine minimization, salt resource extraction, and zero liquid discharge (ZLD) operations but is not limited solely to such applications.

Because the present invention does not involve membranes, it is less susceptible to fouling and scaling. Moreover, the process disclosed herein is very simple and involves only pumps, charged surfaces, and manifolds for fluid collection. It is therefore operator friendly, and amenable to remote operation.

The charged ion collection surfaces are often in a substantially parallel configuration or even in a spiral-wound configuration all of which are designed to facilitate both cleaning and swapping of replacements for damaged modules. The surfaces themselves can be metalized electrodes or thin sheets of carbon aerogel composites, or nano-engineered conductive surfaces of various geometries and surface areas, such as, but not limited to, ion-track-etched polycarbonates with metalized surfaces to enable desired sorptive surface morphology and pore structures. As another beneficial electrode structure, beds of carbon aerogel particles can alternatively be used to form electrodes because such beds of carbon aerogel particles have much higher specific area and sorption capacity than beds of conventional carbon powder, and therefore are superior electrodes for deionization purposes.

Specific Description

FIG. 1 shows an exemplary ion pumping embodiment of the present invention, and is generally designated as reference numeral 10. As shown in FIG. 1, ion pumping system/apparatus 10 can include a feed fluid flow input channel 2, a concentrate fluid flow input channel 4, a plurality of disposed fluid flow channels 8 (three are referenced for simplicity) that fluidly communicate with a feed fluid channel 12 (fluid flow shown as a one-way directional arrow) and a concentrate fluid channel 14 (fluid flow also shown as one-way directional arrow), and a plurality of spaced-apart, often equidistantly spaced apart, engineered corrosion resistant charge collection surfaces 16, such as but not limited to metalized electrodes, ion track etched polycarbonates with metalized surfaces, and/or carbon aerogel electrodes.

In the method of operation, fluids, such as, but not limited to, brackish, brine and/or sea water, can be received by channel input 2 and concentrate input channel 4 and can be directed back and forth in an oscillating manner between the plurality of flow channels 8, e.g., as illustrated by the double directional arrow in FIG. 1.

The applied e-field is synchronized with an oscillation fluid pumping frequency by applying the electric field at predetermined times to the designed flow speeds in the feed fluid channel 12 and concentrate fluid channel 14 in a predetermined manner using, for example, a computer 7. As an illustration, the fluid flow rates can be manipulated by a computer 7 controlled fluid circuit (e.g., a feed pump 5 and a concentrate pump 5', and/or operating valves, such as, a feed valve 6 and a concentrate valve 6') in synchronization with applied e-fields directed by the same computer through a coupled electrical circuit 13. Such controls can be made via the computer either via operator control or automatically using custom and/or commercial software (e.g., via a graphical computer interface software program, such as, for example, LabVIEW).

The flow channels 8 themselves are arranged to have widths between about 0.1 mm and up to about 2 mm, often up to about 0.5 mm and lengths between about 0.1 mm and up to about 10 cm in a configured manner that is based upon the positioning of the separated charge collection surfaces 16 operating as conductors, such that when a voltage between about 0.1 volts and up to about 10 volts is applied to the charge collection surfaces 16, predetermined ions are attracted and electrosorb to their surfaces; cations to negatively charged collection surfaces, and anions to positively charged collection surfaces.

The ion content, e.g., the salt content, of the moving fluid is reduced by the amount of sorbed ions removed from bulk solution (i.e., from feed fluid 12). The ions do not flow with the fluid, they remain attached to the electrode surface in the electrostatic double layer. If the fluid now flows in the reverse direction, and simultaneously the voltage is removed, the ions return to solution and are transported with the solution. As the solution moves back and forth between the charge collection surfaces 16 via the plurality of flow channels 8, the desired ions will be "ratcheted" across the plate surfaces so as to be directed along a concentrate flow channel line.

Specifically, if feed source fluid within channel 12 is provided on one side of the charge collection surfaces 16, substantially perpendicular to such surfaces (as shown in FIG. 1), the ions in the solution can be removed, e.g., desalted, by passing it by a series, i.e., a plurality of substantially parallel charge collection surfaces 16 and the water cleaned by such a method can be harvested via a feed fluid output channel 18.

The ions, such as salt, passes along the charge collection surfaces 16 and is accumulated in the concentrate fluid channel 14, e.g., a brine solution, collecting on the side opposite to the feed fluid channel 12 and can be output via a waste output channel 20. The greater the number of charge collection surfaces 16, and thus the greater the number of flow channels 8, the greater the amount of ions, such as salt, that is removed. The greater the number of ions attached to the charge collection surfaces 16, the fewer the number of charge collection surfaces 16 and the fewer the number of flow channels 8 are needed for a desired amount of ion removal. It is to be appreciated that such a parallel flow arrangement, as shown in FIG. 1, enables the system/apparatus to perform in the event that any or a number of the flow channels 8/charge collection surfaces 16 become inoperable for any particular reason, e.g., by fouling, electrical non-communication, plugging, etc.

Figure 2C:
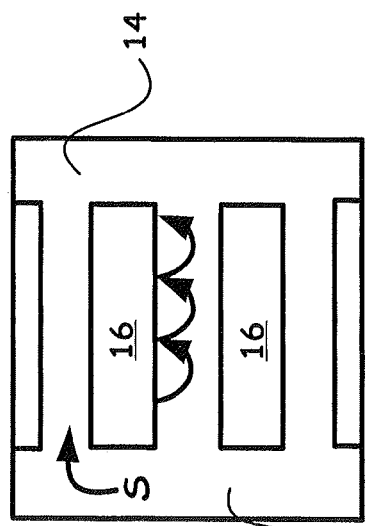
FIG. 2c illustrates the oscillatory back and forth fluid movement and the ratcheting of ions across flow channels.
Figure 2B:
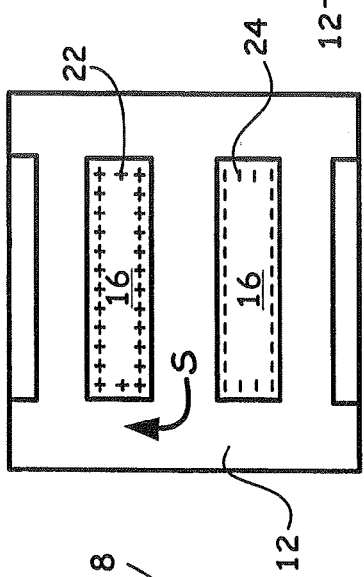
FIG. 2b illustrates the oscillatory back and forth fluid movement and the ratcheting of ions across flow channels.
Figure 2A:
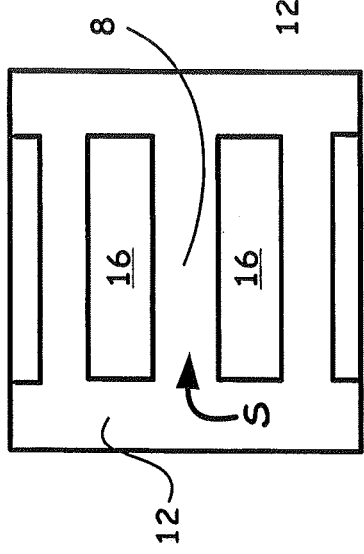
FIG. 2a illustrates the oscillatory back and forth fluid movement and the ratcheting of ions across flow channels.

FIGS. 2a-c shows schematically what happens to an individual packet of electrolyte solution (denoted by the letter 8) as it travels up the feed fluid channel 12, as similarly shown in FIG. 1.

In particular, FIG. 2a illustrates how the oscillatory pumping back and forth of the present invention at frequencies of greater than about 0.5 Hz between the charge collection surfaces 16 causes the solution S packet to enter the space (i.e., flow channel 8) between the surfaces 16.

In FIG. 2b, a field is applied by having predetermined charge collection surfaces 16 enabled with a positive 22 and a negative voltage 24 coupled thereto in timing with the oscillating flow rate of the channels 12 and 14. (It is to be appreciated that while FIG. 2b illustrates a single charge collection surface having a positive charge, it is to be noted that each charge collection surface 16 can also be arranged to have opposite charges applied to a respective opposite face). In the arrangement of FIG. 2b, ions, such as salt, are sorbed to the particular electrode charge collection surface(s) 16 because of the applied field. When the packet S moves back out (i.e., back into feed fluid channel 12) between the charge collection surface(s) 16 because of the oscillating flow rate within channels 12 and 14, it has lost some of its ions, which remains on the surface of a respective charged collection surface(s) 16.

FIG. 2c illustrates how subsequent cycles force salt to right (denoted by the black curved arrows) and into concentrate fluid flow channel 14. For a particular cycle, the applied field that had been induced, as shown in FIG. 2b, is removed, and flow rate is increased in a timed manner in feed fluid flow channel 12 to coincide with the removal of the applied field, and ions once immobilized by the applied field are thus fluidly moved in a direction towards the concentrated fluid flow channel 14. Additional cycles ratchets trapped ions further toward the direction of concentrate fluid flow channel 14. De-salted S fluid packet then moves up and the cycle is repeated with each charge collection surface(s) 16 stage.

Figure 3B:
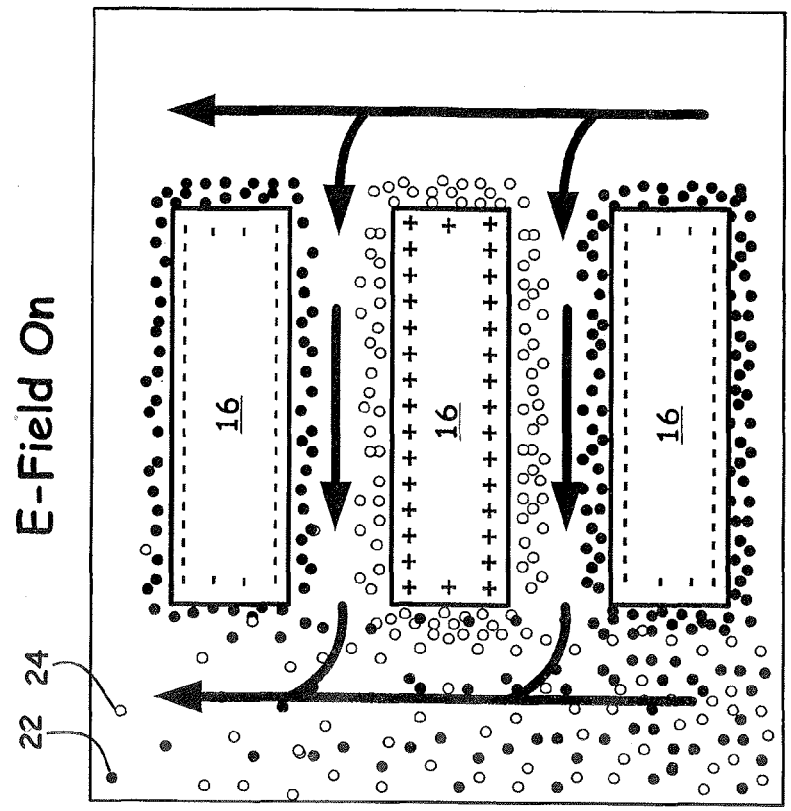
Figure 3A:
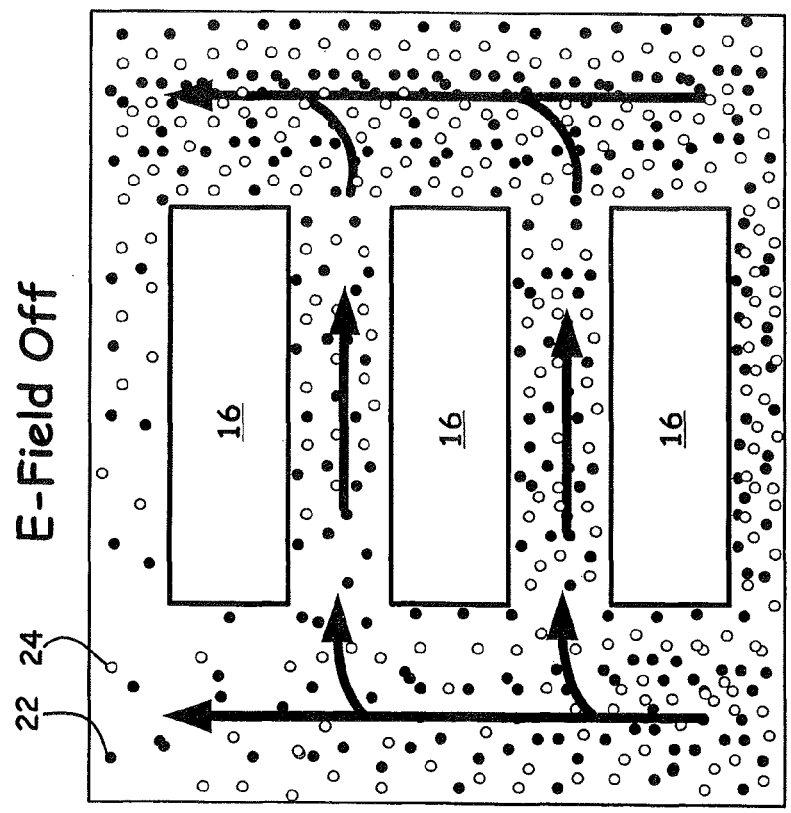
FIG. 3a shows the movement of cations and anions with the e-field off.

FIGS. 3a-b further illustrates the movement of a plurality of cations 22 and anions 24 during the same process. Electrostatic charge (denoted by + and − in FIG. 3b) on electrodes 16 holds cations 22 (denoted by the darkened circles) and anions 24 (denoted by the white circles) in place during fluid movement to the left when an e-field is applied, but releases them for fluid movement to the right when the e-field is removed, as shown in FIG. 3a. Plate spacing (widths between about 0.1 mm and up to about 2 mm, often up to about 0.5 mm and lengths between about 0.1 mm and up to about 10 cm) is optimized to balance desirable short path length for ion separation, with wide spacing for fluid flow.

From theory, the number of ions sorbed per unit surface area can be estimated. In particular, Gouy-Chapman theory developed for planar electrodes predicts that the surface charge density (the amount of salt sorbed to the charged surface) is related to the square root of the salt content of the fluid and the applied voltage. For dilute aqueous solutions at 25° C. the surface charge is given by the relationship as shown in equation (1):

$$\sigma = 11.7 I^{1/2} \sin h(19.5 z\phi) \quad (1)$$

where $\sigma$ is the charge density in $\mu C/cm^2$, I is ionic strength, z is ion charge, and $\phi$ is the electrode potential in volts. As an illustrative case, and where the plates are separated by one millimeter and 0.6 volts are applied to the surface, it is expected that more than 10% of the ions (e.g., salt contained in seawater) to be sorbed to the electrode surface. In such an arrangement, only a few sets of plates are thus needed to remove most of the salt from sea water.

Equation (1) also indicates that the amount of sorbed salt is proportional to the square root of the salinity (I). Thus, there may be some fall-off in efficiency with salinity, but no limit to the salinity of fluids that can be treated with this technology. It necessarily follows that a fluid twice as saline as another may require four times the number of plates for an equivalent decrease in salinity. Total salt sorbed is limited by the amount of anions that are sorbed. Cations tend to be more efficiently collected on the electrodes.

Figure 4:
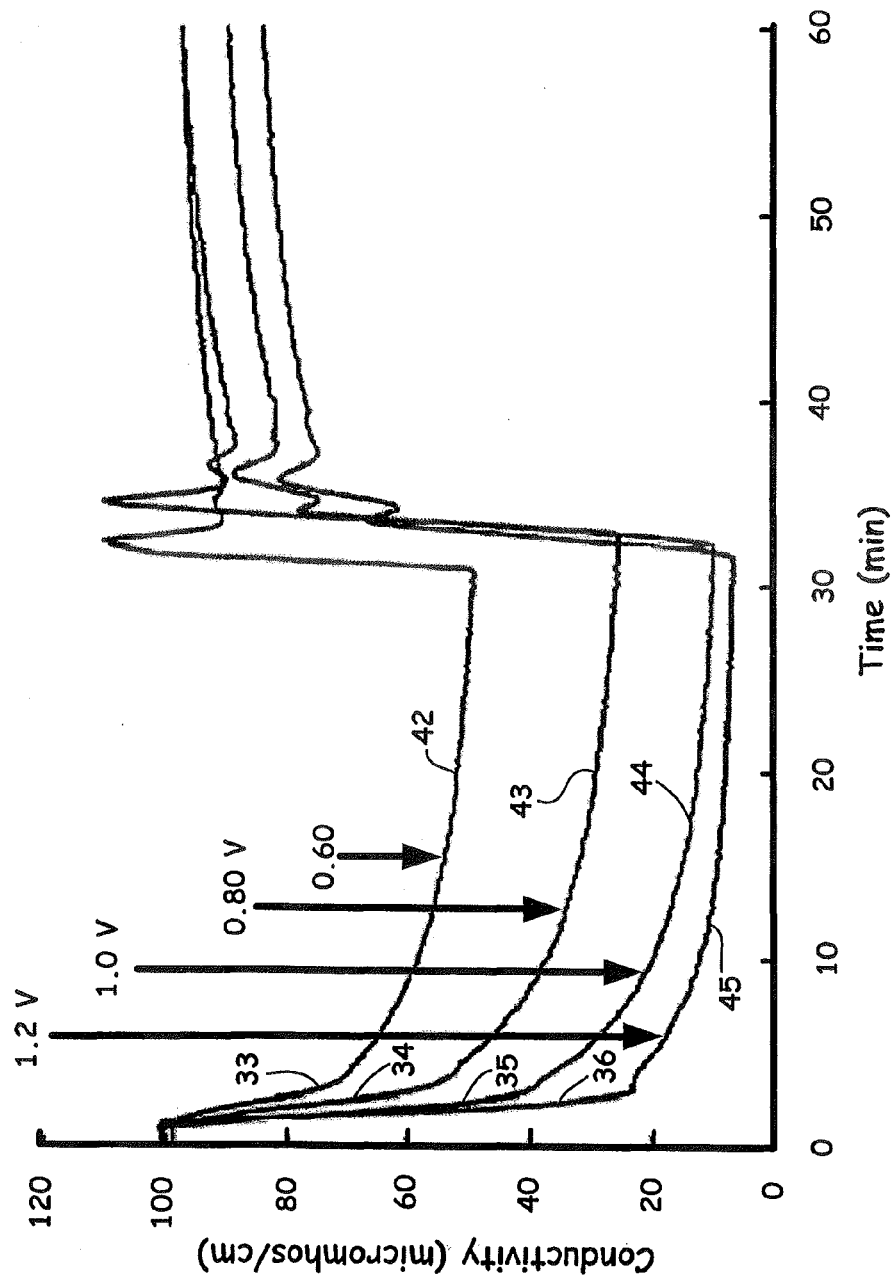
FIG. 4 shows a plot of conductivity versus time to indicate the decrease in conductivity of salt concentration in a fluid as ions are sorbed onto predetermined electrodes.

FIG. 4 shows a conductivity versus time plot and illustrates how less than one volt applied to the electrodes of the present invention can provide significant ion sorption. This is important because irreversible energy losses and other issues associated with oxidation and reduction processes can be avoided that take place at the surfaces of the charged plates, such as electrolysis of water to form oxygen and hydrogen, or chloride to form chlorine gas, that take place above one volt.

A beneficial aspect of the method of the present invention over conventional capacitive deionization (CDI) is that the electrodes configured in the system/apparatus do not need to act as a reservoir of removed salt. Instead, the electrode (charged surface) acts to move the ions, such as salt, from the feed to the concentrate. The effectiveness of CDI has always been limited to fairly dilute salt solution because of this ion storage issue. Even very high surface area electrodes have insufficient capacity. Reversibility of ion sorption also becomes a problem over continuous use.

Another beneficial aspect of the present invention is that the observed rapid ion sorption is capitalized on shortly after voltage is applied. Returning to FIG. 4, such applied voltages (applied voltages denoted with accompanying directional arrows to a respective result) shows the decrease in conductivity (an indicator of decrease in salt concentration) in a fluid as ions are sorbed onto the configured electrodes of the present invention. Note the high early efficiency of the process, (i.e., the deep downward slopes on the far left side of the plots, as designated by reference numerals 33, 34, 35, and 36) and the later decrease in ion flux to the surface (i.e., the slow rate of ion uptake, as designated by reference numerals 42, 43, 44, and 45). In the novel oscillatory pumping process of the present invention, ion sorption is optimized to take advantage of such early high ion sorption flux. The voltage is thus lowered (down to about 0.1 volts) before saturation is achieved. Thus the present invention is designed to work in the regime of most efficient sorption, and avoid electrode saturation effects.

Energy Use

There are two major energy uses in deionization ion pumping (DEIP) desalination: energy to separate charge, and energy to move the fluid back and forth between plates. The overall energy use is a balance between two opposing trends that are a function of the plate spacing. The closer the plates are together, the lower the energy needed to sorb ions out of solution. This is because the energy to move ions varies with $I^2R$, where I is the ion current and R the resistance. It takes half as much energy to sorb ions from plates one millimeter apart than for plates 2 millimeters apart (for ideal behavior). Opposite to that is the energy needed to pump fluids through substantially parallel plates, which increases as the plates are spaced more closely. The pumping energy is proportional to one over the plate spacing cubed. Lowest energy use is a trade-off between the two, often in a range of between 0.1 millimeters to about 2 millimeters, more often from about 0.1 millimeters to about 0.5 millimeters.

DEIP desalination lends itself to energy recovery. The parallel charged plates function as a capacitor. The potential energy of a charged capacitor is given by equation (2):

$$E = \tfrac{1}{2} C q^2 \quad (2)$$

where C is the capacitance and q the stored charge. A simple way to recover half the stored energy is to simply charge another capacitor during discharge. Greater energy recovery is possible by using an inductor. For example, the present invention can be configured to internally re-use this energy by using the discharge current to power pumps needed to drive fluid flow. Likewise, energy recovery from oscillatory fluid motion is recoverable from analogous mechanical devices.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A deionization apparatus using a feed fluid and a concentrate fluid wherein the feed fluid and the concentrate fluid have ions, comprising:
   a feed fluid input,
   a concentrate fluid input,
   a feed flow channel directing the feed fluid from said feed fluid input;
   a concentrate flow channel positioned parallel to said feed flow channel for directing the concentrate fluid from said concentrate fluid input;
   a plurality of disposed flow channels positioned between said feed flow channel and said concentrate flow channel, said plurality of disposed flow channels configured to fluidly communicate an oscillating fluid flow of the feed fluid and the concentrate fluid between said feed flow channel and said concentrate flow channel;

one or more pairs of conductive plates positioned about said plurality of disposed flow channels between said feed flow channel and said concentrate flow channel, a feed fluid valve connected to said feed fluid input and said feed flow channel, a concentrate fluid valve connected to said concentrate fluid input, an electric circuit system, and a computer system connected to said feed fluid valve, said concentrate fluid valve, said one or more pairs of conductive plates, and said electric circuit system, wherein said computer system controls said electric circuit and produces an applied periodic electric field to said one or more pairs of conductive plates and wherein said computer system controls said feed fluid valve and said concentrate fluid valve in synchronization with said oscillating flow and facilitates a directed movement of predetermined ions through said disposed flow channels from said feed flow channel to said concentrate flow channel.

2. The apparatus of claim 1, wherein said applied periodic electric field comprises a voltage from about 10 volts down to about 0.1 volts.

3. The apparatus of claim 1, wherein said applied periodic electric field is applied to said one or more pairs of conductive plates and wherein said one or more pairs of conductive plates include pairs of charge collection surfaces.

4. The apparatus of claim 3, wherein said charge collection surfaces comprise substantially parallel conductive electrodes.

5. The apparatus of claim 4, wherein said conductive electrodes comprise conductive materials selected from: metalized electrodes, thin sheets of carbon aerogel composites, and ion-track-etched polycarbonates with metalized surfaces.

6. The apparatus of claim 1, wherein said oscillating fluid flow is produced by said computer s stem controlling said feed fluid valve and said concentrate fluid valve and applying an oscillating fluid flow of greater than about 0.5 Hz.

7. The apparatus of claim 1, wherein said ions comprise cations and anions selected from: $OH^-$, $Cl^-$, $F^-$, $NO_3^-$, $SO_4^{2-}$, $HCO_3^-$, $CO_3^{2-}$, $H_2PO_4^-$, $HPO_4^{2-}$, and $PO_4^{3-}$, $Li^+$, $Na^+$, $K^+$, $Cs^+$, $Mg^{++}$, $Ca^{++}$, $Cu^{++}$, $Fe^{++}$, $Pb^{++}$, $Zn^{++}$, and $Cd^{++}$.

8. The apparatus of claim 1, wherein the feed fluid in said feed flow channel comprises at least one fluid selected from: alcohols, petroleum, benzene, molten plastics, butter, fats, oils, milk, blood serum, molten glass, semiconductor materials, and pharmaceutical drugs.

9. The apparatus of claim 1, wherein the feed fluid in said feed flow channel comprises a fluid that further comprises colloidal particles at least one of which is selected from: bacteria, viruses, oxide particles, dirt, and dust.

10. The apparatus of claim 1, wherein the feed fluid in said feed flow channel comprises a fluid that further comprises at least one of:

proteins, sugars, and amino acids.

11. The apparatus of claim 1, wherein said plurality of flow channels are configured with widths between about 0.1 mm and up to about 2 mm and lengths between about 0.1 mm and up to about 10 cm.

* * * * *